C. J. O. BERGSTRÖM.
DISH WASHER.
APPLICATION FILED JAN. 21, 1910.

971,658.

Patented Oct. 4, 1910.
2 SHEETS—SHEET 1.

Witnesses

Inventor
Carl Johan O. Bergström

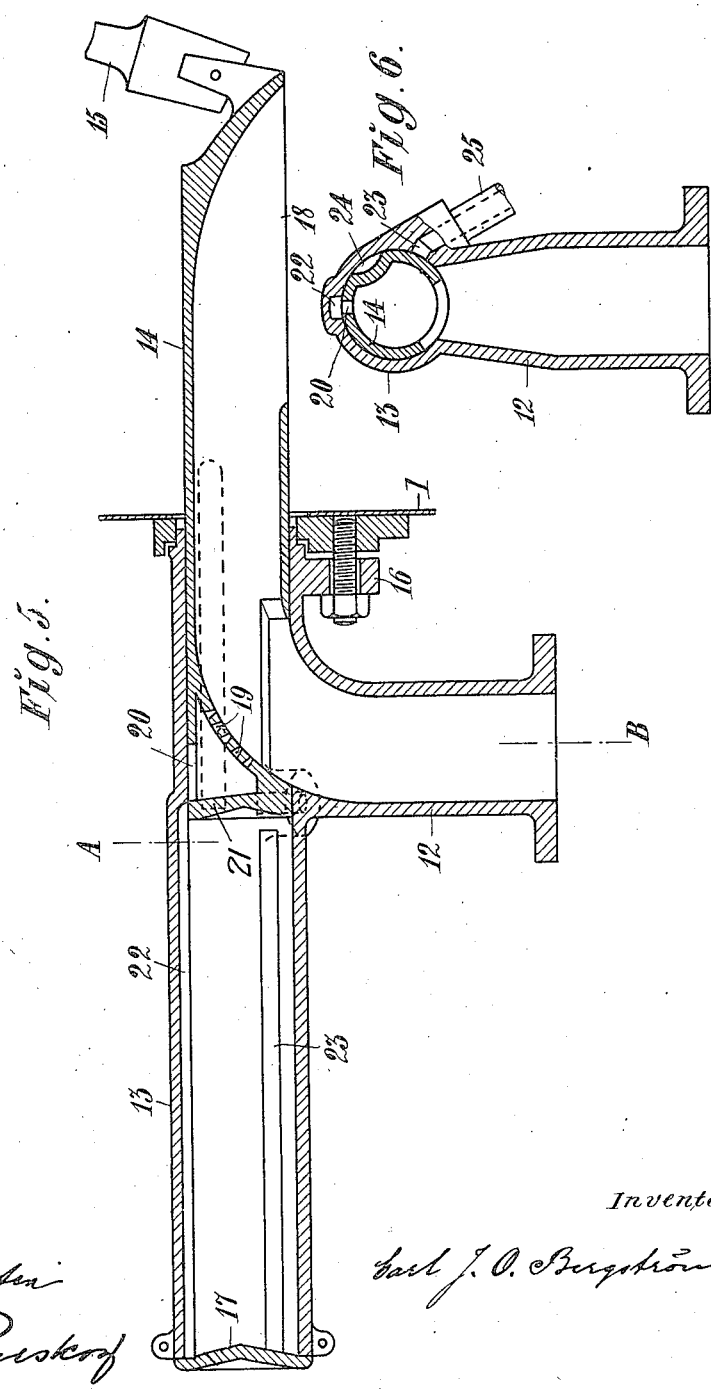

UNITED STATES PATENT OFFICE.

CARL JOHAN OSCAR BERGSTRÖM, OF ALINGSÅS, SWEDEN.

DISH-WASHER.

971,658.  Specification of Letters Patent.  Patented Oct. 4, 1910.

Application filed January 21, 1910. Serial No. 539,294.

*To all whom it may concern:*

Be it known that I, CARL JOHAN OSCAR BERGSTRÖM, a subject of the King of Sweden, residing at Alingsås, in the Kingdom of Sweden, have invented new and useful Improvements in Dish-Washers, of which the following is a specification, reference being had to the drawings accompanying and forming a part hereof.

This invention relates to dish-washers comprising a receptacle to receive the dishes to be cleansed and means for distributing water over the dishes for performing the washing.

The object of this invention is to provide a dish-washer in which the dishes are always exposed to powerful currents of water.

Further objects will hereinafter appear.

Figure 1:
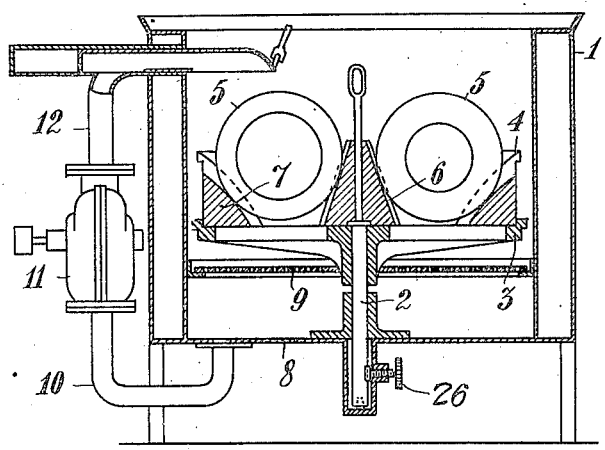
Figure 3:
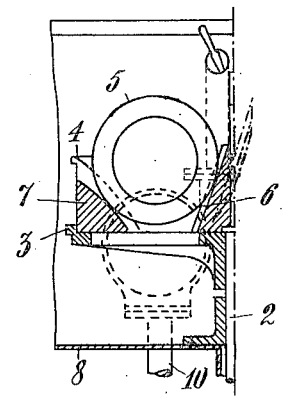
Figure 2:
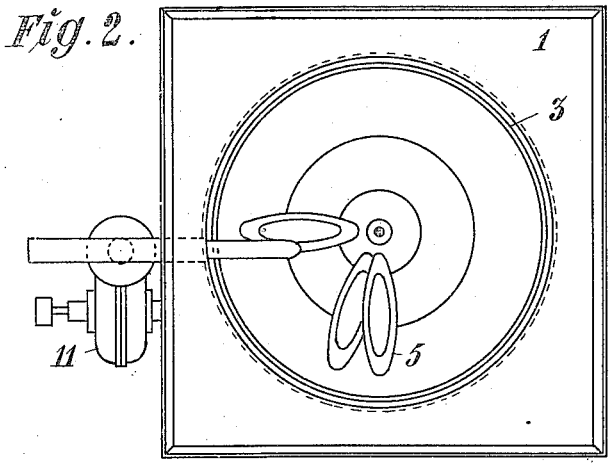
Figure 4:
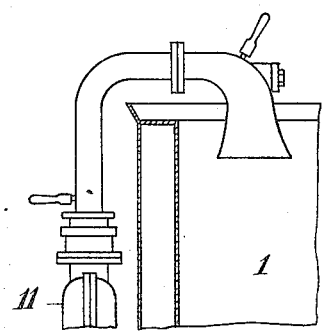

In the drawings, Figure 1 is a vertical sectional view of a dish-washer embodying my invention. Fig. 2 is a plan-view of the same apparatus. Fig. 3 is a vertical sectional view of part of the apparatus at right angles to the section shown in Fig. 1. Fig. 4 is a detail view showing a modified form of the mouth-piece from which the jet of water issues. Fig. 5 is a longitudinal sectional view of one form of my improved mouth-piece. Fig. 6 is a cross-section of the same device on line A—B in Fig. 5.

Referring first to Figs. 1 to 3, 1 is a receptacle open at the top. Journaled in the bottom of the said receptacle is a vertical shaft 2 carrying a perforated round disk 3 serving as a support for the basket 4 containing the dishes to be cleansed. To this end the basket is provided with a conical central portion 6 and an annular portion 7 having grooves for the plates. If desired the basket may be made square in shape instead of round and provided with springy jaws keeping the plates in position. The grooves or other means for keeping the plates in position are, preferably, so arranged that the plates are caused to take up a somewhat slanting position with suitable distances between them. The plates will thus obtain approximately the same positions as the vanes of a turbine. Placed between the disk 3 and the bottom 8 of the receptacle 1 is a strainer 9 adapted to retain coarser remains of food suspended in the wash water. Extending from the bottom 8 is a conduit 10 leading to a pump 11, and leading from the said pump is a second conduit 12 entering into the upper part of the receptacle and ending with one or more mouthpieces. The mouthpieces may suitably have an oblong outgate, so that the water issues in a broad sharp jet, and are preferably movable in such a manner that they may be moved longitudinally, as shown in Fig. 1, or turned laterally, as shown in Fig. 4, so as to allow the basket to be raised and lowered or admit the mouthpieces to be adjusted relatively to the dishes to be washed.

When the apparatus is to be used, the receptacle 1 is filled with water to a suitable height, and the pump 11 is started. The pump thereby sucks water from the receptacle through the conduit 10 and presses the same through the conduit 12 so that the water is caused to circulate. The mouthpiece is adjusted so that the jet of water impinges on one side of the plates in an oblique direction by which the basket 3 carrying the plates is rotated so that all the plates are washed. By suitably adjusting the mouthpieces the dishes may be perfectly cleansed.

In order to increase the action of the jet or jets of water on the plates a brake 26 may be provided adapted to be tightened against the basket or the shaft carrying the said basket.

Larger remains of food are caught and retained by the strainer 9 so that the water is comparatively pure when passing the pump.

It will be understood that the dishes, such as plates or the like, will act in the same manner as the vanes of a turbine and be exposed to a powerful jet or jets of water by which they are thoroughly cleansed.

Figs. 5 and 6 show a mouthpiece adapted to be adjusted longitudinally. In the embodiment shown the upper end of the conduit 12 is formed as a horizontal straight tube 13, and the mouthpiece is formed as a sleeve 14 having a handle 15 for moving the said sleeve longitudinally. Situated at the inner end of the tube 13 is a flange 16 adapted to be screwed on to the receptacle of the dish-washer, the outer end of the tube 13 being closed by a removable cover 17. The sleeve 14, which is movable longitudinally and adapted to be turned within the tube 13 is provided at the lower side of its inward end with an oblong opening 18 through which the water issues. Provided at the rear end of the sleeve 14 is a perforated wall 19 and a hole 20 placed between the said perforated wall and the rear bottom 21 of the sleeve.

When a basket filled with dishes is to be inserted into the apparatus, the sleeve 14 is placed in its rearmost position, out of the way for the basket. When the sleeve is to be moved from the said position toward the center of the apparatus, the sleeve is first turned into a position in which the hole 20 is just opposite a groove 22 in the tube 13, as clearly shown in Fig. 6. Water then passes from the conduit 12 through the perforated wall 19 and through the hole 20 and the groove 22 into the rear part of the tube 13 which is thus filled with water pressing on the rear side of the bottom 21 by which the movement of the sleeve 14 toward the axis of the basket is facilitated.

In order to enable the sleeve 14 to be easily moved from the position shown in Fig. 5 into the tube 13, the latter is provided with a groove 23, and for the same purpose the sleeve is provided at its outer side with a groove 24. If the sleeve 14 is turned so that the groove 24 is just opposite the groove 23 and the sleeve is thereupon moved into the tube 13, the water behind the bottom 21 passes through the said grooves into the pipe or tube 25 which is connected to the suction side of the pump. By this means the movements of the sleeve are considerably facilitated. The pump is suitably a centrifugal pump by which the advantage is gained that the pump need not be stopped whenever the conduit is to be closed, due to the fact that a centrifugal pump may be allowed to work even if the conduit is shut off.

By the form of mouthpiece last described it is thus made possible to easily shut off the current of water through the passage and at the same time bring the mouthpiece out of the way of the basket carrying the dishes so that the said basket may be removed and a new basket filled with dishes to be washed be inserted into the apparatus.

I claim:

1. In a dish-washer, the combination of a receptacle, a conduit having its terminal at the top thereof and emptying into the said receptacle, a dish basket rotatably mounted in the said receptacle, and a pump for causing water to circulate from the lower part of the said receptacle through the said conduit down upon the dishes, the discharge end of the conduit being formed so as to cause the water to issue at an oblique angle to the dish basket and to impinge on the dishes so as to cause the basket to rotate.

2. In a dish-washer, the combination of a receptacle, a conduit having its terminal at the top thereof and emptying into the said receptacle, a dish basket rotatably mounted in the said receptacle, a pump for causing water to circulate from the lower part of the said receptacle through the said conduit down upon the dishes, the discharge end of the conduit being formed so as to cause the water to issue at an oblique angle to the dish basket and to impinge on the dishes so as to cause the basket to rotate, and means for braking the rotary movement of the basket.

3. In a dish-washer, the combination of a receptacle, a conduit having its terminal at the top thereof and emptying into the said receptacle, a dish basket rotatably mounted in the said receptacle, a pump for causing water to circulate from the lower part of the said receptacle through the said conduit down upon the dishes, and a nozzle slidably and rotatably mounted within the said conduit and adapted to be moved out into the body of the receptacle above the dish basket, said nozzle being formed so as to cause the water to issue at an oblique angle to the dish basket and to impinge on the dishes so as to cause the basket to rotate.

CARL JOHAN OSCAR BERGSTRÖM.

Witnesses:
 AUG. SÖRENSEN,
 KARL RUNCSKOG.